(12) United States Patent
Philip

(10) Patent No.: US 7,416,108 B2
(45) Date of Patent: Aug. 26, 2008

(54) HIGH STRENGTH DIFFUSION BRAZING UTILIZING NANO-POWDERS

(75) Inventor: Vinod Philip, Orlando, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 705 days.

(21) Appl. No.: 10/666,203

(22) Filed: Sep. 18, 2003

(65) Prior Publication Data
US 2004/0050913 A1 Mar. 18, 2004

Related U.S. Application Data

(63) Continuation-in-part of application No. 10/056,141, filed on Jan. 24, 2002, now Pat. No. 6,726,086.

(51) Int. Cl.
B23K 31/02 (2006.01)
B23K 35/34 (2006.01)

(52) U.S. Cl. .................... 228/248.1; 148/24

(58) Field of Classification Search ............ 148/22; 228/194
See application file for complete search history.

(56) References Cited

U.S. PATENT DOCUMENTS

| | | | |
|---|---|---|---|
| 4,008,844 A | 2/1977 | Duvall et al. |
| 4,096,615 A | 6/1978 | Cross |
| 4,098,450 A | 7/1978 | Keller et al. |
| 4,152,816 A | 5/1979 | Ewing et al. |
| 4,270,256 A | 6/1981 | Ewing |
| 4,381,944 A | 5/1983 | Smith, Jr. et al. |
| 4,493,451 A | 1/1985 | Clark et al. |
| 4,676,843 A | 6/1987 | Nazmy |
| 4,705,203 A | 11/1987 | McComas et al. |
| 4,736,883 A | 4/1988 | Morgan et al. |
| 4,804,815 A | 2/1989 | Everett |
| 4,830,934 A | 5/1989 | Ferrigno et al. |
| 5,086,968 A | 2/1992 | Fawley et al. |
| 5,156,321 A | 10/1992 | Liburdi et al. |
| 5,437,737 A | 8/1995 | Draghi et al. |
| 5,549,767 A | 8/1996 | Pietruska et al. |
| 5,806,751 A | 9/1998 | Schaefer et al. |
| 5,836,075 A | 11/1998 | Fitzgerald et al. |
| 5,902,498 A * | 5/1999 | Mistry et al. ........... 219/121.64 |
| 5,956,845 A | 9/1999 | Arnold |
| 5,964,963 A * | 10/1999 | Turchan et al. ............... 148/22 |
| 6,193,141 B1 | 2/2001 | Burke et al. |
| 6,195,864 B1 | 3/2001 | Chesnes |
| 6,325,871 B1 | 12/2001 | Burke et al. |
| 6,331,217 B1 | 12/2001 | Burke et al. |
| 6,365,285 B1 | 4/2002 | Chesnes |

(Continued)

OTHER PUBLICATIONS

WO/9606700—Mar. 1996, Linden.*

Primary Examiner—Kiley Stoner

(57) ABSTRACT

A braze material (10) including nano-sized filler material particles (14). The nano-sized particles will melt at a temperature significantly lower than the micron-sized particles used in prior art braze materials, thereby eliminating or reducing the need for the addition of temperature depressant materials such as boron or silicon. The resulting braze joint is substantially free of detrimental boride and suicides phases, thereby improving the material properties of the joint, eliminating the need for a separate post-braze diffusion heat treatment, and permitting a subsequent welding operation with reduced risk of cracking. The braze heat treatment may also function as a solution heat treatment, a pre-weld heat treatment or a post-weld heat treatment.

12 Claims, 1 Drawing Sheet

U.S. PATENT DOCUMENTS

| | | |
|---|---|---|
| 6,454,885 B1 | 9/2002 | Chesnes |
| 6,508,000 B2 | 1/2003 | Burke et al. |
| 6,520,401 B1 * | 2/2003 | Miglietti .................... 228/194 |
| 6,575,349 B2 | 6/2003 | VanEsch |
| 2001/0004473 A1 | 6/2001 | Strutt et al. |
| 2003/0008764 A1 | 1/2003 | Wang et al. |
| 2003/0077398 A1 | 4/2003 | Strutt et al. |

* cited by examiner

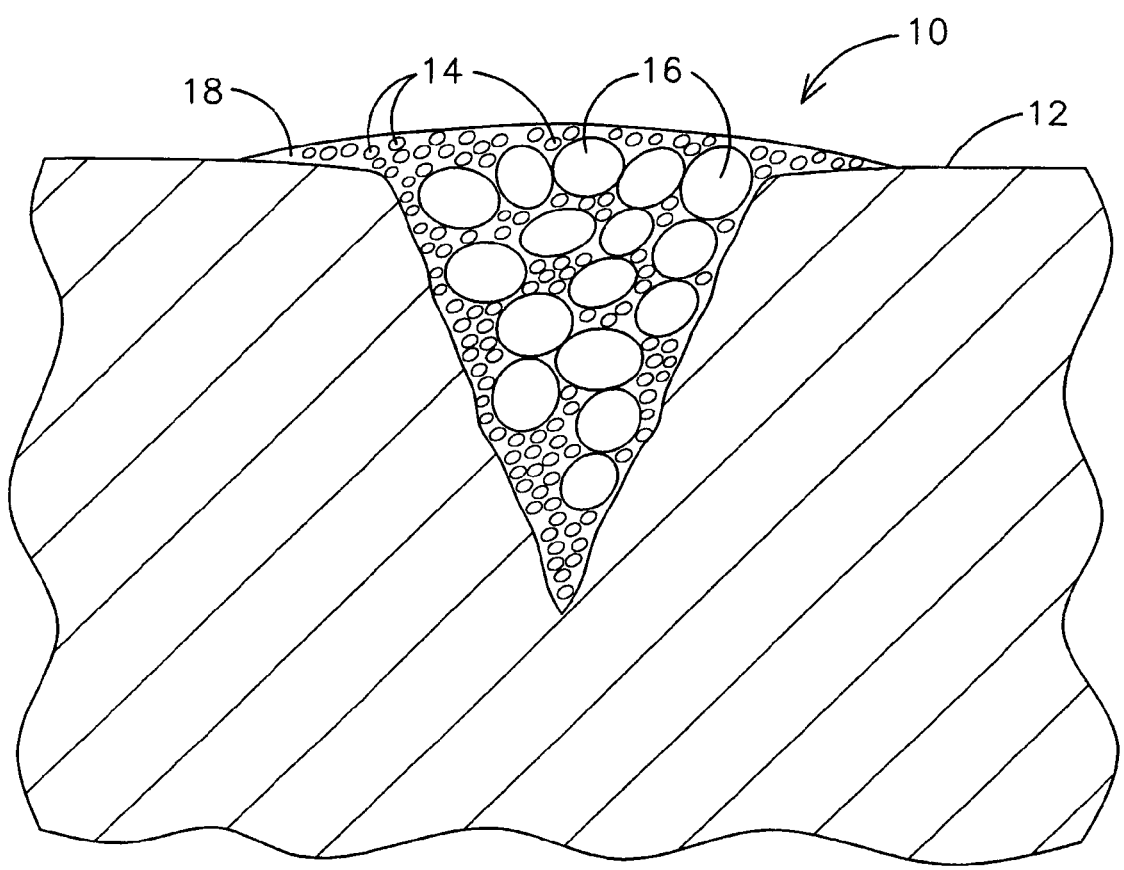

HIGH STRENGTH DIFFUSION BRAZING UTILIZING NANO-POWDERS

RELATED APPLICATIONS

This application is a continuation-in-part and claims benefit of the Jan. 24, 2002, filing date of U.S. application Ser. No. 10/056,141 now U.S. Pat. No. 6,726,086 which is incorporated herein by reference.

FIELD OF THE INVENTION

This application applies generally to the field of metallurgy, and more specifically to the manufacturing and repair of alloy articles, and in particular, to the manufacturing and repair of a superalloy component of a gas turbine engine.

BACKGROUND OF THE INVENTION

High temperature cobalt-based and nickel-based superalloys are commonly used in the manufacture of gas turbine engine components, including combustors, rotating blades and stationary vanes. During the operation of these components in the harsh operating environment of a gas turbine, various types of damage and deterioration of the components may occur. For example, the surface of a component may become cracked due to thermal cycling or thermo-mechanical fatigue or it may be eroded as a result of impacts with foreign objects and corrosive fluids. Furthermore, such components may be damaged during manufacturing operations even prior to entering service. Because the cost of gas turbine components made of cobalt-base and nickel-base superalloys is high, repair of a damaged or degraded component is preferred over replacement of the component.

Several repair techniques have been developed for various applications of superalloy materials. Fusion welding of superalloy materials is known to be a difficult process to control due to the tendency of these materials to crack at the area of the weld deposit/joint. However, with careful pre-weld and post-weld stress relief, control of welding parameters, and selection of welding materials, repair welds can be performed successfully on superalloy components.

Brazing is also commonly used to join or to repair superalloy components. One limitation of brazing is that brazed joints are typically much weaker than the base alloy, and so they may not be appropriate in all situations, such as repairs on the most highly stressed areas of the component.

Another process that has been used successfully for repair and material addition to superalloy components is known by several different names: diffusion bonding; diffusion brazing; and liquid phase diffusion sintering. These names generally refer to a process wherein a powdered alloy is melted at a temperature that is less than the liquidous temperature of the component alloy and allowed to solidify to become integral with the component. The powdered alloy typically includes particles of a high strength base alloy, for example the same alloy as is used to form the base component, along with particles of a braze alloy having a lower melting temperature than the base alloy, for example the base alloy with a melting point depressant such as boron or silicon. The following United States patents describe such processes and are hereby fully incorporated by reference herein: U.S. Pat. Nos. 4,381,944; 4,493,451; 5,549,767; 4,676,843; 5,086,968; 5,156,321; 5,437,737; 6,365,285; and 6,454,885. The component and powder are subjected to a heat cycle, often called a brazing heat treatment, wherein the temperature is selected so that the braze alloy having the lower melting temperature will become liquid and will wet the surfaces of the higher melting temperature base alloy and component alloy. The component is held at this elevated temperature for a sufficient interval to promote liquid phase sintering. Liquid phase sintering is a process whereby adjacent particles in a powder mass are consolidated by diffusion through a liquid phase present between the particles. As the melting point depressant diffuses away from the braze area, the melting point of the remaining material will increase and the liquid material will solidify to form the desired braze joint. This process may be used to join two pieces, to repair a damaged area, or to add material to a component. Upon completion of this cycle, typical braze alloys will have formed undesirable large blocky or script-like brittle phases composed of chromium, titanium, and the family of refractory elements (e.g., tungsten, tantalum) combined with the melting point depressants. These brittle phases weaken the repaired component and decrease its ductility in the region of the repair. A further post-braze diffusion heat treatment may be applied at a somewhat lower temperature to break down the brittle borides, carbides and silicides into fine, discrete blocky phases and to further drive the melting point depressant away from the braze joint to more fully develop the desired material properties. This diffusion heat treatment step may extend for a just a few hours to as long as 24 hours or more. Such a liquid phase diffusion bonding process is capable of forming a joint with material properties approximating but typically not as good as those of the base alloy. Welding is generally avoided proximate the braze joint because the embrittling effect of the residual melting point depressant may cause cracking during cool down from the high temperature required for welding. Further reductions in processing times and improvements in the material properties resulting from a diffusion brazing process are desired.

DESCRIPTION OF THE DRAWINGS

The sole FIGURE is a partial cross-sectional view of a superalloy component having a crack filled with a braze repair material including nano-sized base alloy particles and larger braze alloy particles suspended in a carrier.

DETAILED DESCRIPTION OF THE INVENTION

The sole FIGURE illustrates an improved brazing material 10 filling a surface-opening crack in a superalloy component 12. The brazing material (mixture) 10 includes filler particles of a base alloy 14 such as a superalloy with a composition similar to that of the component 12, and optionally particles of a braze alloy (braze filler) 16, suspended in a carrier 18. The materials selected for the component 12, base alloy (superalloy filler) 14, braze alloy (braze filler) 16 and carrier 18 may have chemical compositions known in the art of brazing or other compositions particularly suited for a specific application. However, the size of the particles of base alloy 14 is less than the size of such particles used in prior art brazing materials. In particular, the size of particles of base alloy 14 are selected to be small enough so that the melting temperature of the base alloy particles 14 is significantly less than the melting temperature that the same material would exhibit in particle sizes used in prior art brazing processes. The reduced melting temperature of the small superalloy filler particles 14 permits the brazing mixture 10 to be composed with a reduced amount of melting point depressant material when compared to prior art brazing materials, thereby minimizing or eliminating the adverse impact that the melting point depressants have on the resulting brazed joint properties.

Prior art brazing materials utilize particles in the micron-size range, perhaps from as small as 50 microns to as large as 120 microns or larger, for example. Nano-sized particles of an alloy have been known to exhibit lower incipient surface melting temperatures than the melting temperature of the bulk alloy, i.e. the melting temperature of micron-sized or larger particles of the same alloy. This phenomenon is believed to be related to the lower activation energy required to liberate atoms from the surface of a nano-sized particle as compared to the larger particles. Additionally, nano-powders also exhibit extremely high sinterability due to the tremendous increase in total surface area while going from the micron-size regime to the nano-sized regime. The present inventor has innovatively recognized the advantage of utilizing nano-sized particles in a braze material mix in order to eliminate or to reduce the amount of melting point depressant necessary to achieve a desired lower incipient melting temperature. It is recognized that any typical powder sample set may have an incidental number of particles in the nano-size range. The present invention contemplates particles that are specifically produced to be nano-sized, i.e. to have a cross-sectional dimension in the nano-size range. In one embodiment, the filler mix used to form a brazing mixture may include only a nano-sized superalloy filler powder selected for its mechanical and chemical properties without the need for any separate braze filler alloy selected for its lower melting point property. Alternatively, a nano-sized superalloy filler may be mixed with a micron-sized and/or nano-sized braze filler alloy wherein the amount of melting point depressants such as boron or silicon is reduced when compared to the prior art because of the reduced melting temperature provided by the nano-size of the superalloy and braze filler particles. In yet other embodiments, a combination of nano-sized and micron-sized superalloy filler particles may be used alone or with micron-sized and/or nano-sized braze filler alloy particles to create a braze material. The volume percentage of nano-sized particles in the total mix of particles may be 100%, 50%, 30-70% or 40-60% for example in various embodiments.

The supermetal alloy filler particles 14 may have a size of less than 100 nanometers, or less than 75 nanometers, or less than 50 nanometers, or less than 40 nanometers, for example. In other embodiments, these particles 14 may have any size range between 10-100 nanometers. As may be appreciated by viewing the FIGURE nano-sized particles not only provide a melting temperature reduction effect, but they are also effective in penetrating and filling tightly spaced cracks and crevices. The nano-sized particles are able to penetrate farther into a closed crevice, and they also provide less surface tension resistance to the flow of melted braze alloy particles 16 for embodiments wherein a separate braze alloy is used. Two sets of nano-sized particles 14 may be mixed, for example, particles in the 20-60 nanometer range (for example 40 nm mean diameter with standard deviation of 1.2-2.0) may be mixed with particles in the 60-100 nanometer range (for example 80 nm mean diameter with standard deviation of 1.2-2.0).

In one embodiment, a braze repair mixture may include superalloy filler particles 14 having a size range sufficiently small so that the particles exhibit a melting temperature at least 50° F. less than the bulk melting temperature, i.e. the temperature that would be exhibited by particles having the same composition but having a size in the micron range, such as the prior art particles having a size range exceeding 50 microns. In a further embodiment, these superalloy filler particles 14 may have a size range sufficiently small so that the particles exhibit a melting temperature at least 75° F. less than the bulk melting temperature. The size range may be sufficiently small so that the particles 14 exhibit a melting temperature that is less than the solution temperature of the substrate material of component 12. In other embodiments, the size of the particles 14 is sufficiently small so that they have a melting temperature that is at least 25° F. or 50° F. or 75° F. below than the solution temperature of the surrounding substrate material 12. If the melting temperature reduction is of sufficient magnitude, the superalloy filler may be used in a braze material for certain applications without the need for a separate braze alloy with an even lower melting temperature. Alternatively, a separate braze filler alloy may be included in the mix, and the melting temperature of the superalloy filler may be between that of the braze filler alloy and that of the component substrate alloy.

The brazing temperature regiment may be selected to fully or to partially melt the superalloy particles 14 when the superalloy particles are used alone. A range of sizes of particles 14 may be used with a temperature regiment that provides melting of at least a portion of the particles. When braze alloy particles 16 are used with the superalloy particles 14, the brazing temperature regiment may be selected to fully melt the braze alloy particles 16 while not melting, partially melting or fully melting the superalloy particles 14. Because the use of melting point depressants is avoided or minimized, the overall heat treatment sequence of a brazing process can be significantly simplified and shortened by avoiding or reducing the duration of the post-braze diffusion heat treatment that is traditionally necessary to eliminate the large brittle phases caused by the melting point depressant. This may represent a reduction in the time required for a repair procedure of from 4-24 hours, for example.

A manufacturing method for nickel-based or chrome-based superalloy components may include a diffusion brazing process utilizing the braze mixture 10 to form a braze joint. Because the nano-sized superalloy filler particles 14 of the braze mixture 10 allow the braze joint to be substantially free of the brittle phases of the melting point depressants such as boron or silicon, it becomes possible to perform a welding process proximate the braze joint without the occurrence of an unacceptable degree of cracking in the weld or the braze joint. The braze joint of the present invention having substantially reduced or no melting point depressant will have higher ductility than a prior art braze joint containing more melting point depressant, therefore it will be able to withstand the high temperatures associated with a welding process without the formation of shrinkage cracking upon post-weld cool down, and it will also be able to withstand higher levels of stress during service.

The nano-sized filler particle constituent of braze material 10 may be nickel, cobalt, binary alloys of nickel-cobalt (such as 70/30 wt % nickel/cobalt), nickel-aluminum (such as 90/10 wt % nickel/aluminum), nickel-chromium (such as 75/25 wt % nickel-chromium), cobalt-chromium (such as 75-25 wt % cobalt-chromium), or combinations of the above, for example. Alternatively, the nano-sized filler particle constituent may be a commercially available superalloy powder, such as a nickel-based superalloy (IN-738 or IN-939) or a cobalt-based superalloy (Mar-M509). Other material selections may be made depending upon the requirements of the particular application. Optionally, the nano-sized particles may be coated with a melting point depressant such as by sputtering a coating of boron or silicon onto the surface of the individual particles. This method of sputtering will ensure that only a thin layer of melting point depressants are deposited on the nano-particles, thereby limiting the overall amount of melting point depressants to much lower levels than in the prior art. Additionally, given the fact that these melting point depressants are limited to the surface layer of the particles, their inter-diffusion during sintering is significantly enhanced due to localized surface melting and diffusion as well as the extremely large surface areas present at the nano-scale.

The micron-sized constituent of braze material 10 may be any of the above described materials or others selected for a particular application. These particles may typically be in the 45-100 micron size range (−150/+325 mesh). The weight ratio of the nano-sized to the micron-sized constituents may be 100/0 for applications where only nano-sized particles are used, or at least 70/30, or at least 50/50 in other example applications.

Braze material 10 may be selected to braze in temperatures ranging from 2,120-2,300° F., with nickel-based materials being in the lower end of this range and cobalt-based materials being in the higher end of this range, with a holding time of only about 30 minutes when no melting point depressant is used to approximately 1.5 hours when a reduced amount of melting point depressant is used. In one embodiment, only the micron-sized constituent may include a melting point depressant. Alternatively, only nano-sized particles may be used with no melting point depressant or with a reduced amount of melting point depressant when compared to prior art braze materials. Alternatively, both nano-sized and micron-sized particles may be used with no melting point depressant.

The present invention may be used for repairs, for the joining of two component work pieces, for material addition, or in any other application where a brazing process is advantageous. The applicant has discovered that it is possible to eliminate the time and expense of one of the heat treatment cycles that is normally required in a manufacturing or repair process involving liquid phase diffusion material addition to a superalloy component. This is accomplished by selecting the composition of the powders, the size of the powders, and the brazing heat cycle used to achieve a desired material property in such a manner so that the brazing heat cycle is essentially the same as or incorporates another one of the other heat cycles required for the component. In this manner, the two heat treatments may be accomplished during one heat cycle, thereby reducing the time and expense of performing two separate thermal processes on the component. Note that the phrase "essentially the same as" when used herein is meant to include those processes or materials that fall within the allowable range of variations that are normally accommodated by another process or material. For example, if a heat treatment is specified as being a given temperature ±10° F. for a given hold time, then a brazing heat treatment that falls within the ±10° F. temperature window for the same hold time would be considered to be essentially the same as the specified heat treatment. As used herein, the term "incorporates" means that a first heat treatment cycle encompasses all of the temperature, hold time and transient rate requirements specified in a second heat treatment cycle, so that the first heat treatment cycle accomplishes the material property changes that are the objective of the second heat treatment cycle.

By way of example, a component may be formed of a nickel-base superalloy such as IN 939 available from Inco Alloys International, Inc. Processes known in the art may be used to cast the component from the IN 939 alloy material. Investment casting is an advanced casting process wherein the part may be cast in near-net shape with an excellent surface finish. Complex components such as gas turbine blades and vanes are often cast using an investment casting process. To achieve a predetermined set of material properties, the cast material may be subjected to a solution heat treatment as part of the component manufacturing process. For example, the component may be held for four hours (±15 minutes) at a temperature of 2,120° F. in a vacuum of 0.3 Pa (2 micrometer Hg), with ten minute holds at each of 800° F. and 1,600° F. during the heat-up transient. The component is then cooled via inert gas cooling in the furnace at a controlled rate to below 1,000° F. in twenty minutes or less in order to precipitate the desired micro-structural phases and to achieve the desired tensile strength, creep and fatigue properties.

While precision casting techniques can produce alloy components having near-net shape and requiring only minimal machining operations, it may be desirable in some applications to add material to the as-cast product in order to reach a final configuration. A liquid phase diffusion sintering process may be used to add such material. By utilizing nano-sized particles 14 in the braze material 10, a brazing heat cycle may be specified to incorporate the manufacturing solution heat treatment cycle. In particular, the peak temperature and holding period at the peak temperature may be made essentially the same for both the manufacturing solution heat treatment and the brazing heat treatment, and the rapid cool down to below 1,000° F. in twenty minutes or less may be made essentially the same for both purposes. The brazing heat treatment cycle, if required at all, may be specified to include a post-brazing diffusion step at a temperature somewhat below the peak solution heat treatment temperature, but above the critical aging precipitation temperatures. In this manner, the brazing heat treatment incorporates the solution heat treatment cycle and is essentially the same as the solution heat treatment cycle with regard to the important parameters affecting material properties. Accordingly, the manufacturing process may include the following steps:

cast component from IN 939 obtain a braze material powder mixture containing nano-sized particles (the nano-particles may be used either in dry powder form or in a emulsion/dispersion using solvent/carriers such as de-ionized water, organic solvents such as ethanol, propanol, inorganic solvents such as HCl, etc.)

clean component surface as necessary apply powder mixture in dry form or in slurry form (mixed with a commercially available carrier/binder such as "s-gel" sold by Wall Colmonoy Corporation) to cleaned component surface apply combined solution/braze heat treatment of 2,120° F. for four hours in vacuum of 0.3 Pa, holding for ten minutes at each of 800° F. and 1,600° F. during heat-up cool to below 1,000° F. using inert gas cooling in twenty minutes or less (no post-brazing diffusion heat treatment)

cool to room temperature

The above-described material and processing technique may be useful for producing gas turbine parts such as vanes, ring segments and combustor transition pieces, for example. Judicious selection of the powder mixture allows the single thermal cycle to be applied as both the manufacturing solution heat treatment and the liquid phase diffusion bonding braze heat treatment, thereby eliminating the necessity for two separate heat cycles. The liquid phase diffusion bonding (sintering) process is purposefully designed to utilize a brazing heat treatment that incorporates the established manufacturing solution heat treatment for the base material in order to permit the combining of these two thermal operations.

For superalloy components that have already been placed into service, a liquid phase diffusion sintering process may be used to repair service related defects. An IN 939 component may be repaired with the a nano-sized powder mixture using a brazing heat treatment that incorporates a heat cycle that is essentially the same as the original manufacturing solution heat treatment. In this manner, not only is the diffusion bonding accomplished, but also the alloy material forming the component is rejuvenated to have material properties essentially the same as when the component was originally formed and superior to prior art diffusion brazing processes. Such a repair process for an IN 939 component may include the following steps:

- obtain a braze material powder mixture including nano-sized particles (the nano-particles may be used either in dry powder form or in a emulsion/dispersion using solvent/carriers such as de-ionized water, organic solvents such as ethanol, propanol, inorganic solvents such as HCl, etc.)
- clean surface as necessary
- apply powder mixture in dry form or in slurry form (mixed with a commercially available carrier/binder such as "s-gel" sold by Wall Colmonoy Corporation) to component surface areas needing repair
- shake component to ensure adequate filling of powder into voids being repaired
- apply combined braze/rejuvenation heat treatment of 2,120° F. for four hours in vacuum of 0.3 Pa, holding for ten minutes at each of 800° F. and 1,600° F. during heat-up
- cool to to below 1,000° F. using inert gas cooling in twenty minutes or less
- cool to room temperature The present invention may further be applied to reduce the time and cost associated with the repair of a component when both a fusion weld repair and a powder diffusion sintering process are used to accomplish the repair. One may envision a single component having service-related degradation that is most effectively repaired by making a weld repair on a first portion of the component and by making a liquid phase diffusion repair on a second portion of the component. This may occur when the part has cracks in the both the critical/high-stress areas as well as in the non-critical/low stress areas. The highly stressed areas may be repaired by a welding process while the lower stressed areas may be repaired by a brazing process. A larger amount of thermal stress would be induced in the part if only welding were to be used as compared to when a weld and braze combination is used. A pre-weld heat treatment is normally used in advance of a weld repair in order to minimize the risk of weld-induced cracking by re-dissolving (re-solutioning) the detrimental phases or precipitates that are generated within the alloy microstructure during the course of high temperature service exposure. It is possible to design a liquid phase diffusion repair process to include a brazing heat treatment cycle that is essentially the same as a pre-weld heat treatment regiment. Such a process may include the steps of:

- clean a component to remove service-induced contaminants
- obtain a braze material powder mixture including nano-sized particles (the nano-particles may be used either in dry powder form or in a emulsion/dispersion using solvent/carriers such as de-ionized water, organic solvents such as ethanol, propanol, inorganic solvents such as HCl, etc.)
- apply the powder mixture in dry form or in slurry form (mixed with a commercially available carrier/binder such as "s-gel" sold by Wall Colmonoy Corporation) to a portion of the component surface
- bond the powder mixture to the component by liquid phase diffusion bonding using a combined brazing/pre-weld heat treatment heat cycle to achieve a predetermined material property in the component material
- perform a welding process on the component
- apply a post-weld heat treatment to the component A post-weld heat treatment is commonly applied to a component after a fusion welding process in order to reduce the stresses created in the heat affected zone as a result of the temperature transient created by the welding. Whereas the above-described procedure combined the pre-weld heat treatment and the liquid phase diffusion bonding brazing heat treatment, it is also possible to combine the liquid phase diffusion bonding brazing heat treatment with a post-weld heat treatment. Such a method may include the steps of:

- clean a component to remove service-induced contaminants
- perform a pre-weld heat treatment on the component
- perform a welding process on the component
- obtain a braze material powder mixture including nano-sized particles (the nano-particles may be used either in dry powder form or in a emulsion/dispersion using solvent/carriers such as de-ionized water, organic solvents such as ethanol, propanol, inorganic solvents such as HCl, etc.)
- apply the powder mixture in dry form or in slurry form (mixed with a commercially available carrier/binder such as "s-gel" sold by Wall Colmonoy Corporation) to a portion of the component surface
- bond the powder mixture to the component by liquid phase diffusion bonding using a combined brazing/post-weld heat treatment heat cycle to achieve a predetermined material property in the component material This process may be implemented so that the combined brazing/post-weld heat treatment is also the same as a manufacturing solution heat treatment so that the single heat cycle also provides a rejuvenating effect to achieve material properties essentially the same as those provided in the as-manufactured component.

One skilled in the art may appreciate that this invention may be applied to nickel-base alloys as well as cobalt-base alloys, or to any alloy manufacturing or repair process where a liquid phase diffusion bonding process is used to add material or to repair defects on a component. By selecting braze material powder size and mixtures that provide a desired material property when subjected to a brazing heat treatment that is the same as or incorporates another heat treatment scheduled to be performed on the component, a time and cost saving process may be implemented wherein the brazing heat treatment and the other scheduled heat treatment are implemented in a single heating cycle. Advantageously, a brazing heat treatment may be selected to be the same as or to incorporate and established manufacturing solution heat treatment, a pre-weld heat treatment, a post-weld heat treatment, and/or a rejuvenating heat treatment.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

I claim as my invention:

1. A braze material for diffusion brazing of an article formed of a superalloy material, the braze material comprising a carrier and superalloy filler particles, the superalloy filler particles comprising a first portion of nano-sized particles and a second portion of micron-sized particles.

2. The braze material of claim 1, tither comprising the filler particles comprising a size less than 75 nanometers.

3. The braze material of claim 1, further comprising the filler particles comprising a size less than 50 nanometers.

4. The braze material of claim 1, further comprising the filler particles comprising a size less than 40 nanometers.

5. The braze material of claim 1, further comprising braze alloy particles having a melting point temperature below that of a bulk melting temperature of the superalloy material of the micron-sized superalloy filler particles and above that of the nano-sized superalloy filler particles.

6. The braze material of claim 5, wherein a weigh; ratio of the nano-sized superalloy filler particles to the micron-sized constituents is at least 70/30.

7. The braze material of claim 1, further comprising a coating of a melting point depressant material on a surface of individual filler particles.

8. The braze material of claim 1, further comprising a coating of one of the group of boron and silicon on a surface of individual filler particles.

9. The braze material of claim 1, wherein the filler particles comprise a size sufficiently small so that they exhibit a melting temperature that is less than a solution temperature of the superalloy material.

10. The braze material of claim 1, wherein the nano-sized particles comprise a size range of 10-100 urn and the micron-sized particles comprise a size range of 45-100 microns.

11. The braze material of claim 1, wherein the nano-sized particles comprise a size range such that they exhibit a melting temperature at least 50° F. less than a melting temperature of the micron-sized particles.

12. The braze material of claim 1 being substantially free of boron and silicon.

* * * * *